United States Patent Office 2,925,402
Patented Feb. 16, 1960

2,925,402

COMPOSITIONS AND METHOD FOR CURING HYDROXY HYDROCARBONYL SUBSTITUTED SILOXANE RESINS

John L. Speier, Pittsburgh, Pa., assignor to Dow Corning Corporation, Midland, Mich., a corporation of Michigan No Drawing. Application February 14, 1955
Serial No. 488,163

12 Claims. (Cl. 260—46.5)

This application relates to a method of curing completely condensed organosiloxane resins.

This application is a continuation-in-part of the applicant's copending application Serial No. 463,062, filed October 18, 1954 (now U.S. Patent No. 2,723,987, issued November 15, 1955), which in turn was a continuation-in-part of the then copending application Serial No. 398,897, filed December 17, 1953 (now abandoned).

This application is also a continuation-in-part of applicant's copending application Serial No. 463,061, filed October 18, 1954, which is itself a continuation-in-part of application No. 398,896, filed December 17, 1953, both of which are now abandoned.

It has long been known that organosiloxane resins make excellent high temperature coatings for metal and other surfaces. It has also been known that these coatings tend to be more corrosion resistant than do similar coatings made from organic materials. However, the organosiloxane coatings heretofore employed, especially those which contain only organosilicon resins, require higher temperatures and longer curing time than is needed for most organic finishes. In general, organosilicon resins heretofore commercially available protect metal and glass surfaces from corrosion better in most cases than organic resins. However, these previously employed organosilicon resins leave much to be desired in the way of protection for metal surfaces under rigid conditions such as those encountered in seawater and the like.

It was known prior to this application that completely condensed organosiloxanes, i.e., siloxanes containing no silicon bonding hydroxyls, could be employed for coating base members. However, as is shown in U.S. Patent 2,610,169 these materials require even higher temperatures and more prolonged curing schedules than the more commonly employed hydroxylated siloxane resins. The present invention relates to a method of curing siloxane resins which obviates the above difficulties.

It is the object of this invention to provide a method of curing completely condensed organosiloxane resins at sufficiently low temperatures and in a sufficiently short period of time so that the curing will be commercially feasible. Another object is to provide superior silicone resin coatings for metal and other surfaces. Other objects and advantages will be apparent from the following description.

This invention relates to a method of curing completely condensed copolymeric siloxanes containing from 5 to 75 mol percent siloxane units of the formula $$XR_nSiO_{\frac{3-n}{2}}$$

in which X is a functional radical of the group HOR'— and (YOOC)$_a$R''— in which R' is a divalent saturated aliphatic or cycloaliphatic hydrocarbon radical in which the hydroxyl group is attached to at least the third carbon atom away from the silicon, R'' is a divalent or trivalent saturated aliphatic or cycloaliphatic hydrocarbon radical wherein each carbonyl group is attached to at least the third carbon atom away from the silicon atom, Y is an alkyl radical or hydrogen atom and $a$ is an integer from 1 to 2 inclusive, R is of the group monovalent hydrocarbon radicals free of aliphatic unsaturation and halogenated monovalent hydrocarbon radicals free of aliphatic unsaturation and $n$ has a value from 0 to 2, the remainder of the siloxane being composed of siloxane units of the formula $$Z_mSiO_{\frac{4-m}{2}}$$

in which Z is of the group monovalent hydrocarbon radicals and halogenated monovalent hydrocarbon radicals and $m$ has an average value from 0 to 3 inclusive and in which copolymeric siloxane the average ratio of total organic groups to silicon ranges from 1 to 1.7, by heating a mixture of said siloxane and a poly-functional organic curing compound capable of condensing with the X groups in the siloxane to give cross linking, until the siloxane is cured.

In carrying out the method of this invention it is only necessary to mix the siloxane and the polyfunctional organic curing compound in the desired proportions and thereafter heat until a satisfactory cure is obtained. The curing temperatures vary with the reactants employed but may range from 30° C. up to 250° C. or higher. In general, satisfactory cures may be obtained in the temperature range from 100–150° C. for periods of 30 minutes or less. The curing operation may be either a one or more step process. Thus the mixture of siloxane and organic curing compound may be partially reacted and the product thereafter molded or applied as a coating and the curing completed by further heating. Alternatively, the mixture may be heated continuously until a satisfactory cure is obtained.

The method of this invention is particularly adaptable for the application of siloxane protective coatings in which the base member can be dipped in a mixture of the siloxane and the curing compound and thereafter heated until the film is cured.

The proportions of the functional $$XR_nSiO_{\frac{3-n}{2}}$$

units in the siloxane should be at least 5 mol percent in order to obtain satisfactory cures. The upper limit will be determined by the thermal stability desired in the finished product. If a high degree of thermal stability is desired, the organofunctional siloxane units should be present in amount of 5 to 20%. This reduces the amount of organic material present in the resin and hence the stability of the cured film is essentially the same as that of conventional silicone resins. If thermal stability is not the primary factor in the final product, higher amounts of the organofunctional siloxanes with a proportional increase in the amount of organic curing agent may be employed.

It should be understood that siloxanes containing both silicon bonded OH groups and the X groups above defined can be cured by heating them with organofunctional curing agents. However, such a process does not give cured resins equivalent to those prepared by the method of this invention.

The functional organosilicon compounds of the type $$XR_nSiO_{\frac{3-n}{2}}$$

in which X is a hydroxylated group are prepared in accordance with the methods set forth in the aforesaid copending application. Those organofunctional siloxanes in which X is a carboxylated radical are prepared in accordance with the methods described in applicant's copending application Serial No. 463,062, filed October 18, 1954, now Patent No. 2,723,987, issued November 15, 1955 (which is hereby made a part of this specification by reference). These siloxanes may be copolymerized with hydrocarbon substituted and/or halogenated hydrocarbon substituted siloxanes in accordance with the method set forth in said applications.

If desired the siloxanes employed herein can contain one or more than one type of

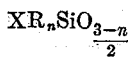

units. In those organofunctional siloxanes in which X is a hydroxylated radical, R' can be any saturated aliphatic divalent hydrocarbon radical of at least 3 carbon atoms such as propylene, butylene and octadecylene and any saturated cycloaliphatic divalent hydrocarbon radical of at least 4 carbon atoms such as

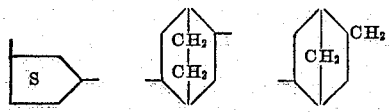

and

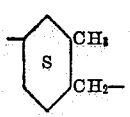

A preferred form of siloxane unit of this type is that having the general formula

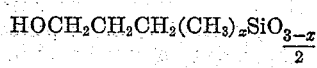

where $x$ is an integer of from 0 to 1 inclusive.

In the organofunctional siloxanes in which X is a carboxylated radical, R'' can be any divalent saturated aliphatic hydrocarbon radical of at least 3 carbon atoms such as propylene, butylene and octadecylene or any trivalent aliphatic saturated hydrocarbon radical of at least 3 carbon atoms such as

and

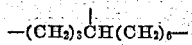

or any cyclic divalent aliphatic hydrocarbon radical of at least 5 carbon atoms such as cyclohexylene, cyclopentylene, methylcyclopentylene, and

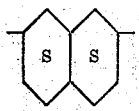

and any trivalent cycloaliphatic saturated hydrocarbon radical of at least 6 carbon atoms such as

and

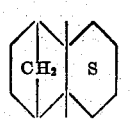

It should be understood that the term carboxyl group as employed herein includes the group COOH and COOY in which Y is an alkyl radical such as methyl, ethyl or octadecyl.

In the organofunctional siloxane units R can be any monovalent hydrocarbon radical free of aliphatic unsaturation such as alkyl radicals such as methyl, ethyl and octadecyl; cycloalkyl radicals such as cyclohexyl and cyclopentyl and aromatic hydrocarbon radicals such as phenyl, benzyl, tolyl, naphthyl and xenyl. R can also be any halogenated monovalent hydrocarbon radical free of aliphatic unsaturation such as chlorophenyl, dibromoxenyl, tetrafluoroethyl, pentafluorobutyl and α,α,α-trifluorotolyl.

For the purpose of this invention the organo-siloxanes of the formula

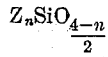

can be any siloxane in which Z is any monovalent hydrocarbon radical such as alkyl radicals such as methyl, ethyl and octadecyl; alkenyl radicals such as vinyl and allyl; cycloaliphatic radicals such as cyclohexyl, cyclopentyl and cyclohexenyl and aromatic hydrocarbon radicals such as phenyl, benzyl, tolyl, naphthyl and xenyl and any halogenated monovalent hydrocarbon radical such as chlorophenyl, trifluorovinyl, tetrafluorobutyl, tetrabromoxenyl and α,α,α-trifluorotolyl. The solxanes can be either homopolymers or copolymers and there can be more than one type of Z group attached to any one silicon atom and the units can be $ZSiO_{1.5}$, $Z_2SiO$ and $Z_3SiO_{.5}$ together with limited amounts of $SiO_2$ units.

The relative proportions of the siloxanes and the polyfunctional organic curing compounds are not critical. Obviously, however, the most efficient operation will be obtained when the organic curing agent is employed in amounts approximately equivalent to the functional X groups in the siloxane. Thus the most efficient operation will usually occur in the range from that in which the organic curing compound is present in amount such that there is one of its functional groups for every OH, COOH and COOY group in the siloxane to that in which there is one mol of organic curing compound per mol of

units (i.e., as in Example 2).

The polyfunctional organic curing compounds which are employed in the method of this invention will vary depending upon the type of X group in the siloxane. In those cases where X is a hydroxylated radical, any hydroxyl reactive polyfunctional organic compound can be employed such as dicarboxylic acids such as maleic, phthalic, terephthalic, malonic and sebacic acids and their esters or anhydrides and diisocyanates such as m-toluene diisocyanate, p,p'-diisocyanato-diphenylmethane and para-diisocyanato-benzene. The isocyanates are the preferred curing materials for the hydroxylated siloxanes. In those cases where X is an acid or ester group any polyfunctional organic compound which is reactive towards carboxylic acids or their esters can be employed. Specific examples of such compounds are polyhydric alcohols such as ethylene glycol, glycerine, pentaerythritol and polyamines such as ethylene diamine, octamethylene triamine, hexamethylene diamine and octadecylene diamine. The diamines are the preferred curing materials for the carboxylated siloxanes.

The superior qualities of the coatings formed by the method of this invention is specifically exemplified in their superior resistance to attack by chemical reagents. This is shown by the fact that metal surfaces which are coated with the resins prepared by the method of this invention show much less corrosion when exposed to salt water, caustic and acid than resins prepared from conventional organosiloxanes. The method of this invention is equally applicable for the preparation of siloxane molding compositions, laminates and cast articles.

The following examples are illustrative only and should not be construed as limiting the invention which is properly delineated in the appended claims.

EXAMPLE 1

A mixture of 105 g. of phenylmethyldichlorosilane, 31.6 g. of phenyltrichlorosilane, 22.3 g. of methyltrichlorosilane and 45.2 g. of

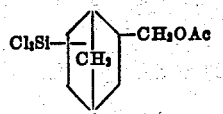

were cohydrolyzed in the presence of toluene and ether. The resulting resin was then refluxed in a mixture of 100 ml. toluene, 50 ml. ethanol and 10 g. of potassium hydroxide for 3 hours at 81° C. The resulting product was a siloxane copolymer resin composed of 55 mol percent phenylmethylsiloxane, 15 mol percent monophenylsiloxane, 15 mol percent monomethylsiloxane and 15 mol percent

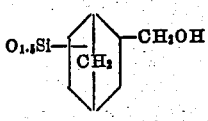

A 70% toluene solution of this resin was mixed with an equivalent amount of m-toluene diisocyanate. Sheet iron panels were coated with this solution and cured 30 minutes at 120° C. The films obtained were light in color, glossy and flexible and were unaffected by hydrogen chloride and by saturated sodium chloride solution when heated in the latter 3 hours at 95° C.

Equivalent results were obtained when the resin was reacted with p,p'-diisocyanato-diphenylmethane.

EXAMPLE 2

97 g. of phenylmethyldichlorosilane, 20.8 g. of methyltrichlorosilane and 29.4 g. of phenyltrichlorosilane, 19 g. of diphenyldichlorosilane and 40 g. of

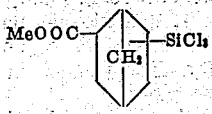

were dissolved in 250 ml. of toluene and 154 ml. of diethylether and hydrolyzed with water. During hydrolysis the mixture was cooled in an ice bath and made almost neutral with sodium hydroxide. The organic layer was washed until neutral, stripped of ether and azeotropically dried. It was then completely condensed by refluxing in a 25% toluene solution for 6 hours with potassium hydroxide in amount of .2% by weight based on the weight of the resin solids. The resulting solution was free of silicon-bonded hydroxyls and was neutralized, washed and dried. The solution was concentrated to 70% by weight solids. The resulting siloxane was the copolymer having the composition 50.8 mol percent phenylmethylsiloxane, 13.9 mol percent monomethylsiloxane, 13.9 mol percent monophenylsiloxane, 7.5 mol percent diphenylsiloxane and 13.9 mol percent

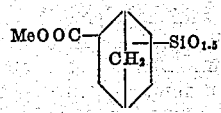

9.3 g. of the above siloxane (Equivalent to .01 mol 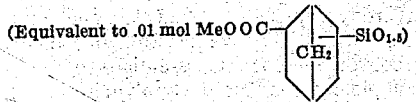)

was mixed with 1.2 g. (.01 mol) of hexamethylene diamine and heated at 250° C. for 2 hours in a nitrogen atmosphere. The resulting viscous resin was dissolved in 5 g. of toluene. In this resin the carboxymethyl group had been converted into an amide having the formula

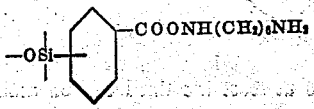

Panels of sheet iron were dip coated with a toluene solution of this resin (A) and were compared with a commercial phenylmethylpolysiloxane resin (B) having the composition 50.8 mol percent phenylmethylsiloxane, 27.8 mol percent monomethylsiloxane, 13.9 mol percent monophenylsiloxane and 7.5 mol percent diphenylsiloxane which contained about 1.5% silicon bonded OH groups and a small amount of a zinc naphthenate catalyst. The panels were cured as shown in the table below and were immersed in a saturated aqueous sodium chloride solution at 90–95° C. and the effect on the film was noted as shown in the table. Plate glass was coated with resins (A) and (B) and the resulting panels cured as shown in the table below and then immersed in concentrated aqueous NaOH and toluene at 30° C. for the times shown.

Table I

| Immersion Media | Resin | Curing Schedule | Results |
|---|---|---|---|
| Saturated aqueous NaCl | A | Air dried 15 min | Unaffected in 4 hrs. |
|  |  | 150° C. for 15 min |  |
|  |  | 250° C. for 15 min |  |
|  | B | Identical | Film blistered and broke in 4 hrs. |
| Concentrated aqueous NaOH | A | Air dried 15 min | Unaffected in 3 days. |
|  |  | 150° C. for 15 min |  |
|  |  | 250° C. for 1 hour |  |
|  | B | Identical | Film softened and loosened in 2 days. |
| Toluene | A | Identical | Softened in 1 min. |
|  | B | Identical | Completely dissolved in 1 min. |

EXAMPLE 3

Equivalent results were obtained when diethylene triamine is employed in the procedure of Example 2.

EXAMPLE 4

When a completely condensed copolymer having the composition 5 mol percent vinylphenylsiloxane, 50 mol percent dimethylsiloxane, 10 mol percent chlorophenylsiloxane, 10 mol percent α,α,α-trifluorotolylsiloxane, 20 mol percent monovinylsiloxane and 5 mol percent gamma-hydroxypropylmethylsiloxane is reacted with m-toluene diisocyanate in accordance with the procedure of Example 1, satisfactory cure of the siloxane resin is obtained.

EXAMPLE 5

When a completely condensed copolymer of 35 mol percent monophenylsiloxane and 65 mol percent of the siloxane

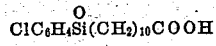

is heated with hexamethylene diamine in accordance with the procedure of Example 2 a cured siloxane resin is obtained.

EXAMPLE 6

When a completely condensed copolymeric siloxane of the formula 50 mol percent phenylmethylsiloxane, 35 mol percent monophenylsiloxane and 15 mol percent phenyl-gamma-hydroxypropylsiloxane is reacted with m-toluene diisocyanate in accordance with the procedure of Example 1, a cured siloxane is obtained.

EXAMPLE 7

When a completely condensed copolymer of 50 mol percent phenylmethylsiloxane, 25 mol percent α,α,α-trifluorotolylsiloxane and 25 mol percent

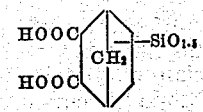

is mixed with hexamethylene diamine in amount such that there is one amino group per one carboxyl group in the mixture and thereafter heated at 150° C. for 30 minutes, a cured siloxane resin is obtained.

That which is claimed is:

1. A method of curing organopolysiloxanes which comprises heating a mixture of (1) a completely condensed copolymeric siloxane containing from 5 to 75 mol percent siloxane units of the formula $$XR_nSiO_{\frac{3-n}{2}}$$

in which X is a functional radical of the formula HOR'— in which R' is a radical of at least three carbon atoms and is of the group consisting of divalent saturated aliphatic and divalent saturated cycloaliphatic hydrocarbon radicals in all of which the hydroxyl group is attached to at least the third carbon atom away from the silicon, R is of the group consisting of monovalent hydrocarbon radicals free of aliphatic unsaturation and halogenated monovalent hydrocarbon radicals free of aliphatic unsaturation and $n$ has an average value from 0 to 1 inclusive, the remainder of said siloxane being composed of siloxane units of the formula $$Z_mSiO_{\frac{4-m}{2}}$$

in which Z is of the group consisting of monovalent hydrocarbon radicals and halogenated monovalent hydrocarbon radicals and $m$ has an average value from 0 to 3 inclusive, said copolymeric organosiloxane having an average of from 1 to 1.7 inclusive total organic groups per silicon atom and (2) a polyfunctional organic curing compound selected from the group consisting of diisocyanates, hydrocarbon dicarboxylic acids, and esters and anhydrides of said acids, until the siloxane is cured.

2. A method of curing an organosiloxane which comprises heating a mixture of (1) a completely condensed copolymeric siloxane containing from 5 to 75 mol percent siloxane units of the formula $$(HOR')R_nSiO_{\frac{3-n}{2}}$$

in which R' is a radical of at least three carbon atoms and is selected from the group consisting of divalent saturated aliphatic and divalent saturated cycloaliphatic hydrocarbon radicals in all of which the hydroxyl group is attached to at least the third carbon atom away from the silicon, R is of the group consisting of monovalent hydrocarbon radicals free of aliphatic unsaturation and halogenated monovalent hydrocarbon radicals free of aliphatic unsaturation and $n$ has an average value from 0 to 1 inclusive, the remainder of said siloxane being composed of siloxane units of the formula $$Z_mSiO_{\frac{4-m}{2}}$$

in which Z is of the group consisting of monovalent hydrocarbon radicals and halogenated monovalent hydrocarbon radicals and $m$ has an average value from 0 to 3 inclusive, in said copolymeric siloxane there being an average of from 1 to 1.7 inclusive total organic groups per silicon atom and (2) a diisocyanate, until the siloxane is cured.

3. A method of curing a siloxane which comprises heating a mixture of (1) a completely condensed copolymeric siloxane containing from 5 to 75 mol percent

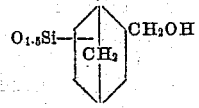

units the remainder of said siloxane being methyl and phenyl siloxane units, said siloxane having an average of from 1 to 1.7 inclusive total organic groups per silicon atom and (2) a diisocyanate, until the siloxane is cured.

4. A method comprising heating a mixture of (1) a completely condensed copolymeric siloxane containing from 5 to 75 mol percent gamma-hydroxypropylmethylsiloxane, the remainder of said siloxane being methyl and phenyl siloxane units, said siloxane having on the average from 1 to 1.7 inclusive total organic groups per silicon atom and (2) a diisocyanate, until the siloxane is cured.

5. A method comprising heating a mixture of (1) a completely condensed copolymeric siloxane containing from 5 to 75 mol percent of polymeric units of the general formula $$HOCH_2CH_2CH_2(CH_3)_xSiO_{\frac{3-x}{2}}$$

where $x$ is an integer of from 0 to 1 inclusive, the remainder of said copolymeric siloxane being siloxane units of the formula $$Z_mSiO_{\frac{4-m}{2}}$$

in which Z is selected from the group consisting of monovalent hydrocarbon radicals and halogenated monovalent hydrocarbon radicals and $m$ is an integer of from 0 to 3 inclusive, said copolymeric siloxane having an average of from 1 to 1.7 inclusive total organic groups per silicon atom and (2) a diisocyanate, until the siloxane is cured.

6. A method comprising heating a mixture of (1) a completely condensed copolymeric siloxane containing from 5 to 75 mol percent of siloxane units of the formula $$HOCH_2CH_2CH_2(CH_3)_xSiO_{\frac{3-x}{2}}$$

where $x$ is an integer of from 0 to 1 inclusive, the remainder of said siloxane being methyl and phenyl substituted siloxane units, said siloxane having on the average from 1 to 1.7 inclusive total organic groups per silicon atom and (2) a diisocyanate, until the siloxane is cured.

7. A resinous coating composition in which the resin forming constituent consists essentially of a mixture of (1) a completely condensed copolymeric siloxane containing from 5 to 75 mol percent of polymeric units of the general formula $$HOCH_2CH_2CH_2(CH_3)_xSiO_{\frac{3-x}{2}}$$

where $x$ is an integer of from 0 to 1 inclusive, the remainder of said siloxane being siloxane units of the formula $$Z_mSiO_{\frac{4-m}{2}}$$

in which Z is selected from the group consisting of monovalent hydrocarbon radicals and halogenated monovalent hydrocarbon radicals and $m$ is an integer of from 0 to 3 inclusive, said copolymeric siloxane having an average of from 1 to 1.7 inclusive total organic groups per silicon atom and (2) a diisocyanate, the diisocyanate being present in an amount such that there is from one of the isocyanate groups for every hydroxypropyl group in the siloxane to one mol of the diisocyanate per mol of the hydroxypropyl substituted siloxane units present.

8. A resinous coating composition in which the resin forming constituent consists essentially of a mixture of (1) a completely condensed copolymeric siloxane containing from 5 to 75 mol percent siloxane units of the formula $$(HOR')R_nSiO_{\frac{3-n}{2}}$$

in which R' is a radical of at least three carbon atoms and is selected from the group consisting of divalent saturated aliphatic and divalent saturated cycloaliphatic hydrocarbon radicals in all of which the hydroxyl group is attached to at least the third carbon atom away from the silicon, R is of the group consisting of monovalent hydrocarbon radicals free of aliphatic unsaturation and halogenated monovalent hydrocarbon radicals free of aliphatic unsaturation and $n$ has an average value from 0 to 1 inclusive, the remainder of said siloxane being composed of siloxane units of the formula $$Z_mSiO_{\frac{4-m}{2}}$$

in which Z is of the group consisting of monovalent hydrocarbon radicals and halogenated monovalent hydrocarbon radicals and $m$ has an average value from 0 to 3 inclusive, in said copolymeric siloxane there being an average of from 1 to 1.7 inclusive total organic groups per silicon atom and (2) a polyfunctional organic curing compound selected from the group consisting of diisocyanates, hydrocarbon dicarboxylic acids, and esters and anhydrides of said acids.

9. A resinous coating composition in which the resin forming constituent consists essentially of a mixture of (1) a completely condensed copolymeric siloxane containing from 5 to 75 mol percent siloxane units of the formula $$(HOR')R_nSiO_{\frac{3-n}{2}}$$

in which R' is a radical of at least three carbon atoms and is selected from the group consisting of divalent saturated aliphatic and divalent saturated cycloaliphatic hydrocarbon radicals in all of which the hydroxyl group is attached to at least the third carbon atom away from the silicon, R is of the group consisting of monovalent hydrocarbon radicals free of aliphatic unsaturation and halogenated monovalent hydrocarbon radicals free of aliphatic unsaturation and $n$ has an average value from 0 to 1 inclusive, the remainder of said siloxane being composed of siloxane units of the formula $$Z_mSiO_{\frac{4-m}{2}}$$

in which Z is of the group consisting of monovalent hydrocarbon radicals and halogenated monovalent hydrocarbon radicals and $m$ has an average value from 0 to 3 inclusive, in said copolymeric siloxane there being an average of from 1 to 1.7 inclusive total organic groups per silicon atom, and (2) a diisocyanate.

10. A resinous coating composition in which the resin forming constituent consists essentially of a mixture of (1) a completely condensed copolymeric siloxane containing from 5 to 75 mol percent siloxane units of the formula $$(HOR')R_nSiO_{\frac{3-n}{2}}$$

in which R' is a divalent saturated aliphatic radical of at least three carbon atoms in which the hydroxyl group is attached to the terminal carbon atom, R is of the group consisting of monovalent hydrocarbon radicals free of aliphatic unsaturation and halogenated monovalent hydrocarbon radicals free of aliphatic unsaturation and $n$ has an average value from 0 to 1 inclusive, the remainder of said siloxane being composed of siloxane units of the formula $$Z_mSiO_{\frac{4-m}{2}}$$

in which Z is of the group consisting of monovalent hydrocarbon radicals and halogenated monovalent hydrocarbon radicals and $m$ has an average value from 0 to 3 inclusive, in said copolymeric siloxane there being an average of from 1 to 1.7 inclusive total organic groups per silicon atom, and (2) a diisocyanate.

11. A method of curing an organosiloxane which comprises heating a mixture of (1) a completely condensed copolymeric siloxane containing from 5 to 75 mol percent siloxane units of the formula $$(HOR')R_nSiO_{\frac{3-n}{2}}$$

in which R' is a saturated aliphatic hydrocarbon radical of at least three carbon atoms in which the hydroxyl group is attached to the terminal carbon atom, R is selected from the group consisting of monovalent hydrocarbon radicals free of aliphatic unsaturation and halogenated monovalent hydrocarbon radicals free of aliphatic unsaturation and $n$ has an average value from 0 to 1 inclusive, the remainder of said siloxane being composed of siloxane units of the formula $$Z_mSiO_{\frac{4-m}{2}}$$

in which Z is of the group consisting of monovalent hydrocarbon radicals and halogenated monovalent hydrocarbon radicals and $m$ has an average value from 0 to 3 inclusive, in said copolymeric siloxane there being an average of from 1 to 1.7 inclusive total organic groups per silicon atom, and (2) a polyfunctional organic curing compound selected from the group consisting of diisocyanates, hydrocarbon dicarboxylic acids, and esters and anhydrides of said acids, until the siloxane is cured.

12. A resinous coating composition in which the resin forming constituent consists essentially of a mixture of (1) a completely condensed copolymeric siloxane containing from 5 to 75 mol percent

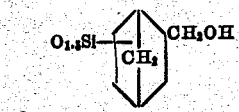

units, the remainder of said siloxane being methyl and phenyl siloxane units, said siloxane having an average of from 1 to 1.7 inclusive total organic groups per silicon atom and (2) a diisocyanate.

References Cited in the file of this patent
UNITED STATES PATENTS

| 2,443,898 | Ellingboe | June 22, 1948 |
| 2,550,205 | Speier | Apr. 24, 1951 |
| 2,687,418 | Sommer | Aug. 24, 1954 |
| 2,768,193 | Gilbert | Oct. 23, 1956 |

OTHER REFERENCES

Speier: J.A.C.S., vol. 74, No. 4, Feb. 20, 1952, pages 1003–1010.